H. R. WARNER & B. E. RAILSON.
COMBINED ROLLER AND BALL BEARING.
APPLICATION FILED FEB. 3, 1916.
1,203,163.
Patented Oct. 31, 1916.
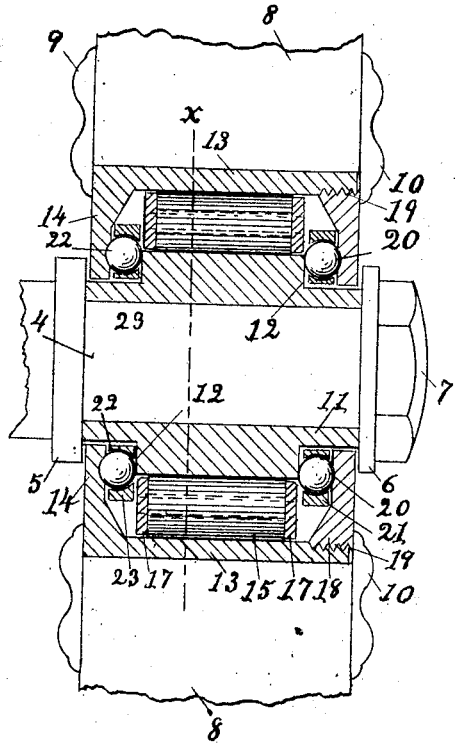
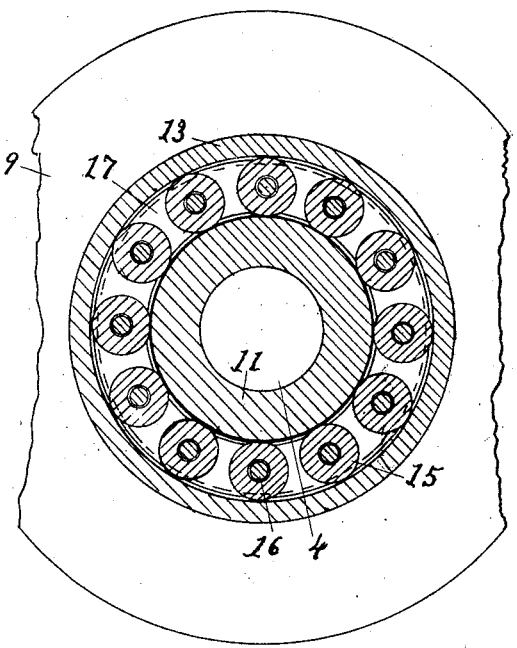
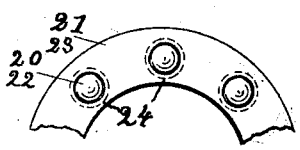
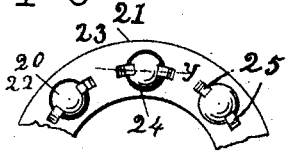
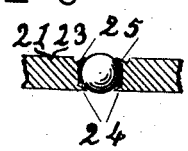
Witnesses
N. S. Waller.
D. E. Waller.
Inventors.
Harold R. Warner.
Bert E. Railson.
By H. X. Stevens.
Attorney

UNITED STATES PATENT OFFICE.

HAROLD R. WARNER AND BERTIE E. RAILSON, OF SEATTLE, WASHINGTON.

COMBINED ROLLER AND BALL BEARING.

1,203,163.      Specification of Letters Patent.      Patented Oct. 31, 1916.

Application filed February 3, 1916. Serial No. 76,067.

*To all whom it may concern:*

Be it known that we, HAROLD R. WARNER and BERTIE E. RAILSON, citizens of the United States, residing at Seattle, in the county of King and State of Washington, have invented certain new and useful Improvements in Combined Roller and Ball Bearings, of which the following is a specification.

This invention relates to roller and ball bearings for vehicles. Axles of vehicles should be tough to resist jolting strains, and hard to resist wear under heavy loads.

The object of this invention is to interpose between the wheel and an axle which is soft enough to be tough, hard roller and ball bearings.

To this end our invention consists in the construction and combination of parts forming a combined roller and ball bearing hereinafter more fully described and particularly stated in the claim, reference being had to the accompanying drawing in which—

Figure 1, shows in longitudinal section a combined roller and ball bearing according to our invention, adjacent portions of a wheel and axle not shaded. Fig. 2, shows a vertical section at line *x*, Fig. 1. Fig. 3, shows in side view a segment of the ball-carrying web. Fig. 4, is an opposite face view of the segment shown in Fig. 3. Fig. 5 is a section view of a fragment at line *y*, Fig. 4.

Let numeral 4 represent a vehicle axle with a shoulder 5, a washer 6 and a screw nut 7; and 8, the hub of a wheel having side collars 9 and 10. A sleeve 11, shaped with flaring shoulders 12, is fitted upon the axle. A bushing 13, having an inwardly projecting flange 14, is fitted closely into the wheel hub 8 and is retained therein by collars 9, 10. Rollers 15, mounted on shaft pins 16 that are rigidly fixed in side rings 17, roll upon the sleeve 11, and within the bushing 13. A collar 18, is screwthreaded at 19 into the bushing and is grooved to form a circular path for balls 20, that are mounted in a spacing ring 21 to roll against one of the shoulders 12, of the sleeve 11. Another set of balls 22, are mounted in a spacing ring 23, to roll in a groove 11. Holes are drilled in each of these rings leaving an inwardly projecting flange 24, at one side, and having prongs 25 projecting inward to retain the balls. Each ring 21—23, is a little thinner than the diameter of a ball 20—22, leaving the balls to project at both sides, and the prongs 25, are formed by driving a cold-chisel into the face of the ring and raising the prong to be afterward bent over the ball. In operation, the wheel hub with its bushing 13, bears upon the rollers 15, and they roll upon the sleeve 11, thus supporting the weight of the vehicle, and the balls between the shoulders 12, and flange 14, and collar 18 resist endwise thrust of the wheel on the axle. The rings 17, also bear against the balls if they move endwise relatively to the axle. After the collar 18, has been screwed into the bushing 13, to properly adjust the ball bearings, it may be so bound by pressure of the hub collar 10. By means of nut 7, and washer 6, the sleeve 11, is rigidly bound against the shoulder 5. By removing the nut 7, the whole wheel, including our bearing, may be slipped off from the axle, so that it may be turned upon either face to examine or adjust the parts; and the sleeve 11, or any other part may be readily replaced if it should become broken or worn.

We claim:—

In a combined roller and ball bearing, a sleeve having an outwardly projecting annular portion with a shoulder at each end; and fitted to removably receive an axle; a bushing fitted to engage a wheel hub and having at one end an inwardly projecting flange circularly grooved for a ball path; rollers mounted on pivot pins between end rings to roll upon the said sleeve within the said bushing; a collar circularly grooved for a ball path and screwthreaded into the said bushing; a set of balls mounted to roll against each shoulder of the said outwardly projecting portion of the sleeve and in the circularly grooved paths respectively; and a spacing ring for each set of balls; the said collar, when screwed into the bushing to its proper adjustment, projecting beyond the face of the bushing to be engaged by a binding collar of the wheel hub.

In testimony whereof we affix our signatures in presence of two witnesses.

HAROLD R. WARNER.
BERT E. RAILSON.

Witnesses:
  G. W. REED,
  C. A. SMITH.